(12) United States Patent
Tseng

(10) Patent No.: US 10,176,199 B2
(45) Date of Patent: Jan. 8, 2019

(54) AUTO TAGGING IN GEO-SOCIAL NETWORKING SYSTEM

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/975,354

(22) Filed: Dec. 18, 2015

(65) Prior Publication Data

US 2016/0103852 A1 Apr. 14, 2016

Related U.S. Application Data

(63) Continuation of application No. 14/328,722, filed on Jul. 11, 2014, now Pat. No. 9,292,518, which is a continuation of application No. 12/890,283, filed on Sep. 24, 2010, now Pat. No. 8,824,748.

(51) Int. Cl.
*G06K 9/00* (2006.01)
*G06F 17/30* (2006.01)
*H04L 29/08* (2006.01)

(52) U.S. Cl.
CPC .. *G06F 17/30256* (2013.01); *G06F 17/30038* (2013.01); *G06F 17/30247* (2013.01); *G06F 17/30784* (2013.01); *G06K 9/00288* (2013.01); *G06K 9/00677* (2013.01); *H04L 67/18* (2013.01); *G06K 2209/27* (2013.01)

(58) Field of Classification Search
None
See application file for complete search history.

(56) References Cited

U.S. PATENT DOCUMENTS

| | | | | |
|---|---|---|---|---|
| 2009/0252383 | A1* | 10/2009 | Adam | G06K 9/00221 382/118 |
| 2010/0046842 | A1* | 2/2010 | Conwell | G06F 17/30265 382/218 |
| 2010/0111377 | A1* | 5/2010 | Monroe | G06K 9/00221 382/118 |
| 2011/0038512 | A1* | 2/2011 | Petrou | G06F 17/30256 382/118 |
| 2013/0046761 | A1* | 2/2013 | Soderberg | G06F 17/30038 707/736 |

* cited by examiner

*Primary Examiner* — Weiwen Yang
(74) *Attorney, Agent, or Firm* — Baker Botts L.L.P.

(57) ABSTRACT

In one embodiment, a social networking system automatically tags one or more users to an image file by creating a list of potential matches, and selecting a subset of potential matches based on location, asking a first user to confirm the subset of potential matches, and tagging one or more matched users to the image file.

20 Claims, 6 Drawing Sheets

US 10,176,199 B2

AUTO TAGGING IN GEO-SOCIAL NETWORKING SYSTEM

RELATED APPLICATIONS

This application is a continuation under 35 U.S.C. § 120 of U.S. patent application Ser. No. 14/328,722, filed 11 Jul. 2014, which is a continuation under 35 U.S.C. § 120 of U.S. patent application Ser. No. 12/890,283, filed 24 Sep. 2010 and issued as U.S. Pat. No. 8,824,748, each of which is incorporated herein by reference.

TECHNICAL FIELD

The present disclosure relates generally to networking systems that enable users to post and share media (such as photographs and videos) and, more particularly, to automatically tagging one or more users to an image or other multimedia file based on location information.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network to connect and coordinate users with local people or events that match their interests.

SUMMARY

Particular embodiments relate to automatically tagging one or more users to an image file by using location information to improve the accuracy of the process. These and other features, aspects, and advantages of the disclosure are described in more detail below in the detailed description and in conjunction with the following figures.

DETAILED DESCRIPTION

Figure 1:
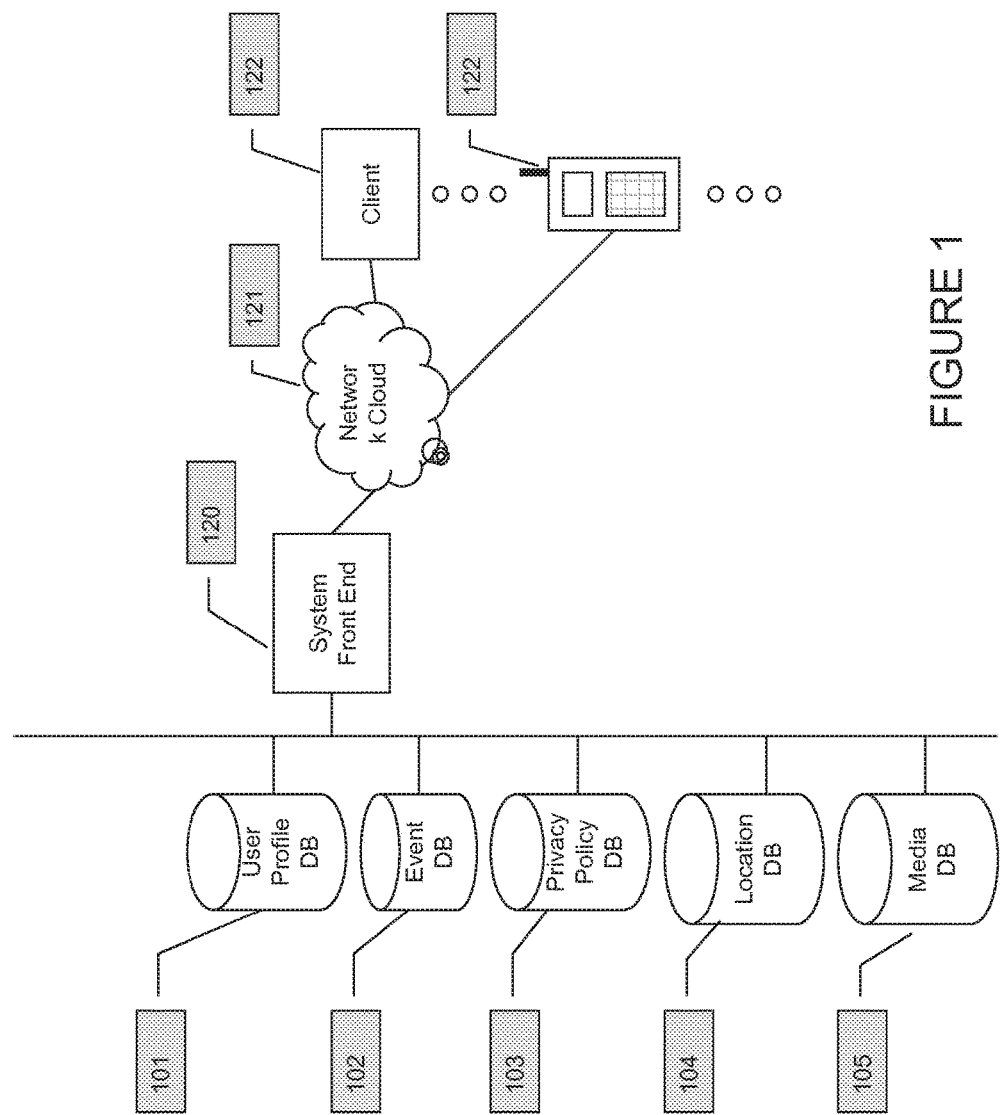
FIG. 1 illustrates an example of a social networking system with location-based services and capabilities.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user first registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. Still further, the social networking system may store one or more images of faces that are associated with individual users. This data can be used, as discussed below, to match faces in newly uploaded media files to users of the social networking system.

A social network system may maintain social graph information, which can be generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times and dates, locations and identities of other users.

Social networking system may maintain a database of information relating to places. Places correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. As described below, a user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including the comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention.

A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user. The privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

FIG. 1 illustrates an example social networking system with automated media tagging capabilities. In particular embodiments, the social networking system may store user profile data in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end 120. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. In particular embodiments, location database 104 may store geo-location data identifying a real-world geographic location of an object, such as a mobile device. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid of the shape. For example, additional information of a place can be business hours, photos, or user reviews of the place. In particular embodiments, location database 104 may store a user's location data. For example, location database 104 may store a user's check-in activities. For example, a user can create a place (e.g., a new restaurant or coffee shop) and the social networking system can store the created place in location database 104. For example, location database 104 can store a user's search activity.

In particular embodiments, a user of the social networking system may upload one or more media files to media database 105. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS coordinates). A user can add additional metadata values to a photo, or tag a photo, during an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 105.

Figure 2:
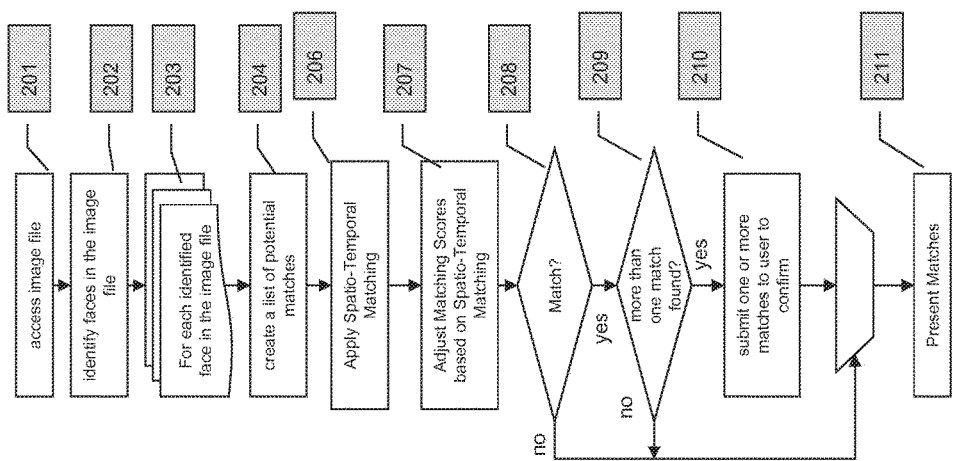
FIG. 2 illustrates an example method of tagging one or more users to an image file in a social networking system with location-based services and capabilities.

FIG. 2 illustrates an example method of tagging one or more users to an image file in a social networking system with location-based services and capabilities. FIG. 2 can be implemented by an auto-tagging process hosted on one or more computing devices of the social networking system. The following process can be executed on-demand in response to a photo-upload or tagging request or as a background or batch process. In particular embodiments, the auto-tagging process may access an image file associated with a user of the social networking system, such as a user that uploaded the image file (201). In particular embodiments, an image file may be a photo with associated metadata. In particular embodiments, an image file may be a video clip with associated metadata. For example, the auto-tagging process can access a photo in media database 105. In particular embodiments, the auto-tagging process may identify one or more faces in the image file that correspond to other users of social networking system or individuals generally (202). In particular embodiments, for each identified face in the image file, the auto-tagging process may create a list of potential matches (203 and 204). In one implementation, the pool of faces that are analyzed are limited to a set of users that are connected in a social graph to the user that uploaded (or is otherwise associated with) the image file. For example, the matching process may limit the pool of candidate faces to the user's first-degree contacts. In other implementations, the pool of candidate faces may be limited to second degree contacts. In particular embodiments, the social networking network may determine a match between a face and a user based on application of a facial recognition or matching algorithm that returns a matching score and comparing the score to a threshold value. For example, facial recognition computer software can calculate a correlation coefficient between a potential match and an identified face, where the correlation coefficient ranges from 0.0 ("no correlation at all") to 1.0 ("perfect match"). Suitable recognition algorithms include Principal Component Analysis with eigenface, Linear Discriminate Analysis, Elastic Bunch Graph Matching fisherface, Hidden Markov model, and neuronal motivated dynamic link matching. The auto-tagging process can select all potential matches having a matching score above a threshold value for further analysis. In particular embodiments, if the auto-tagging process can not find any potential match for an identified face with a sufficient level of confidence, then the auto-tagging process may proceed to find one or more matches for the next identified face. In some implementations, the auto-tagging process may expand the candidate pool of faces from, for example, first-degree contacts of the user or second-degree contacts of the user and re-run the foregoing steps.

In particular embodiments, if the auto-tagging process finds one or more potential matches for the identified face, the auto-tagging process may apply spatio-temporal matching (206) to adjust the matching scores for the potential matches (207). In particular embodiments, the auto-tagging process may determine location data of an image file by accessing geographic location data (e.g. GPS coordinates), user check-in activity data, and/or event data associated with the image file, or based on one or more previous matches already identified in the image file, where the matched user's location is known with some threshold degree of confidence. For example, the auto-tagging process can determine that a photo is associated with a location of the Golden Gate Bridge by a user's tag to the photo (e.g., "Golden Gate Bridge"), or by the photo's geographic location data (e.g., 37° 49'09.15" N, 122° 28'45 11" W) that was appended by a camera or other image capture device. For example, the auto-tagging process can determine that a photo is associated with location Golden Gate Bridge and time stamp Oct. 8, 2009 by an event tagged by a user to the photo (e.g., "Fleet Week 2009, Golden Gate Bridge, Oct. 8, 2009"), or a title of a photo album that the photo belongs to (e.g., "Golden Gate Bridge, Oct. 8, 2009"). For example, if a user is already identified in an image file (e.g., having a correlation coefficient=1.0), the image file has a time stamp of Oct. 8, 2009, and the user has an event "Fleet Week 2009, Golden Gate Bridge, Oct. 8, 2009", then the auto-tagging process can determine that the image file is associated with an event "Fleet Week 2009" and with a location "Golden Gate Bridge."

In particular embodiments, location database 104 may store location data for a user corresponding to a potential facial match in the filtered subset of potential matches. A location data record associated with a user may include location data and a time stamp that are in close proximity to the location associated with the image file. As in previous example, a user corresponding to a potential match in the selected subset of potential matches may have checked in at the Golden Gate Bridge using a geo-social networking client on Oct. 8, 2009. In connection with check-ins using a geo-social networking client application, the location database may store GPS location (e.g., 37° 49'09.15" N, 122° 28'45 11" W) on Oct. 8, 2009, as provided by the client application. Alternatively or additionally, the user may have configured for a calendar entry with a location of "Golden Gate Bridge" on the day Oct. 8, 2009." Still further, the user may have configured, or registered as attending, an event having a location near or at the Golden Gate Bridge. The event management functionality of the social networking system may expose this data to location database 104. In particular embodiments, the auto-tagging process may adjust a matching score associated with the potential match (such as the correlation coefficient computed from facial recognition analysis), if the location data associated with the potential match is in close spatio-temporal proximity to the location data associated with the image file. The auto-tagging process may determine a match between a face of a user by comparing the adjusted match score to a threshold value. As in the previous example of the correlation coefficient, if a potential match has a correlation coefficient of 0.75 as calculated by the facial recognition computer software, and the potential match in close spatio-temporal proximity to the location data associated with the image file, the auto-tagging process can increase the match score by 0.2.

In particular embodiments, the auto-tagging process analyzes the adjusted matching scores to determine whether any matches have been identified (208). In one implementation, the auto-tagging process compares the adjusted score to a threshold value and deems any face of a candidate user above the threshold as a match. In one implementation, the auto-tagging process determines whether the adjusted match score is greater than or equal to a threshold value (e.g. 0.9). If there are two or more matches in the subset of potential matches for an identified face (209), the auto-tagging process may submit the two or more matches in the subset of potential matches to a user to confirm (Step 210). In other implementations, the auto-tagging process may select the highest scoring match. In particular embodiments, the auto-tagging process may tag the one or more matches to the image file (Step 211).

Figure 4:
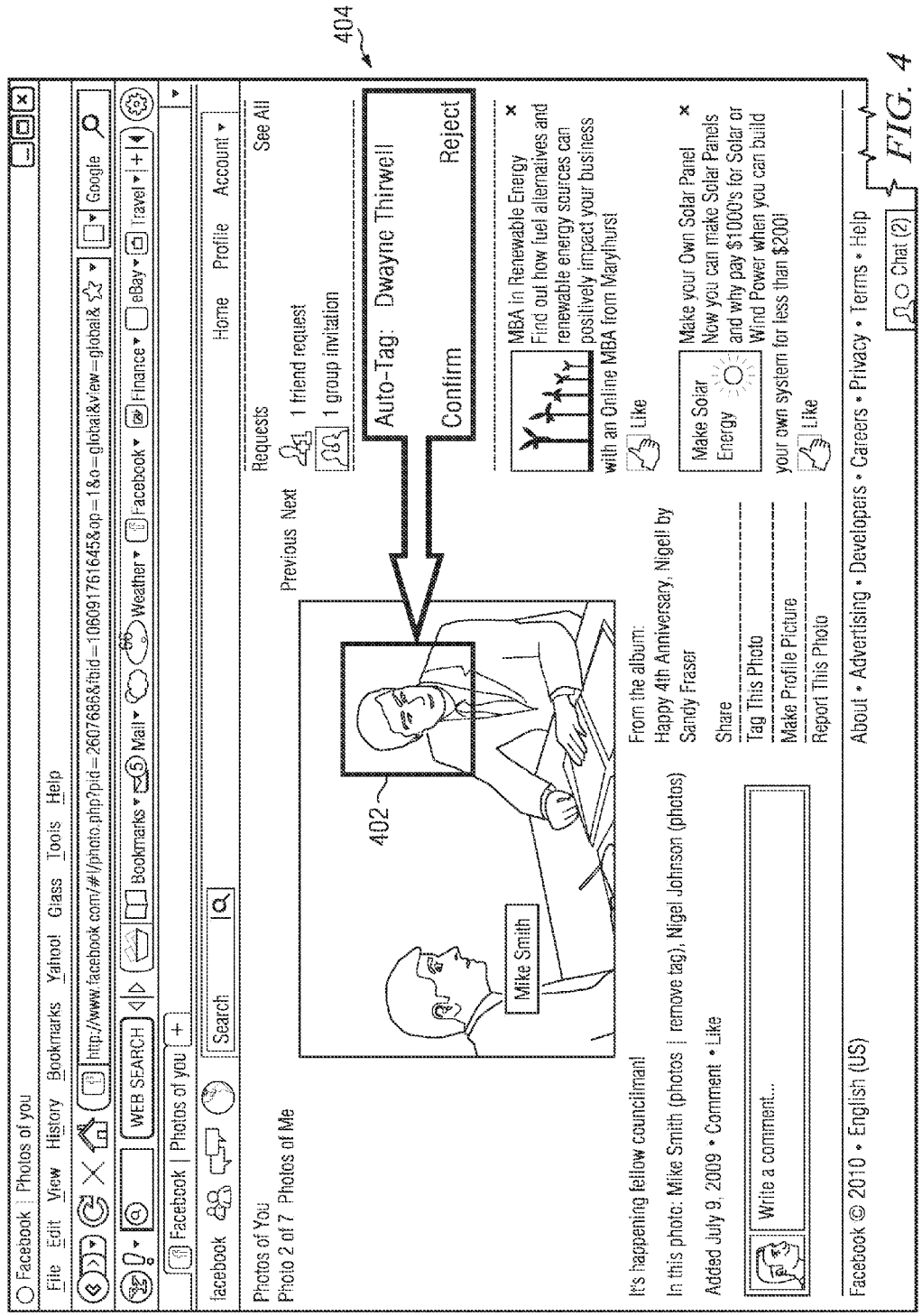
FIG. 4 shows an example user interface.

As FIG. 4 illustrates, in some implementations, the social networking system may present the tag corresponding to a name of a recognized user to the user as auto-tagged results and allow the user to confirm whether he or she wishes to add the tags to the image. For example, a box 402 can be The auto-tagging results can be presented to the user that uploaded the photo during an upload process or at a later time. In addition, the auto-tagging results can be presented to other users that are viewing the image. The other users can confirm that the auto-tagging results are accurate or inaccurate, which information can be used to train the facial recognition algorithms used to identify matches. In addition, the process configured above can be used to select a candidate pool of users in a type-ahead field of a user interface directed to tagging users. For example, the text in the type ahead field can be used to filter the potential matches by user name, while the location-adjusted facial recognition scores can be used to rank the results.

Figure 3:
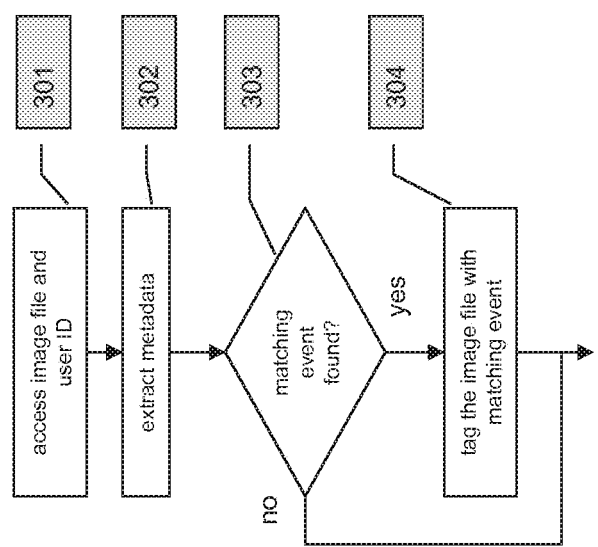
FIG. 3 illustrates an example method of tagging an event to an image file in a social networking system with location-based services and capabilities.

FIG. 3 illustrates an example method of tagging an event to an image file in a social networking system with location-based services and capabilities. In particular embodiments, the auto-tagging process may access an image file corresponding a user identifier. In particular embodiments, an image file may be a photo with associated metadata. In particular embodiments, an image file may be a video clip with associated metadata. For example, the social networking can access a photo uploaded to media database 105 by a user (Step 301). In particular embodiments, the auto-tagging process may extract metadata associated with the image file. For example, the auto-tagging process may extract from photo metadata time stamp, location, or one or more users associated with the photo. For example, the auto-tagging process can extract one or more users associated with a photo by utilizing the example method depicted in FIG. 2 or by using manually tagged results. In particular embodiments, the auto-tagging process may match an event corresponding to the image file. In particular embodiments, the auto-tagging process may match an event to the image file by identifying events that include users that are also tagged or otherwise associated with the image. For example, the auto-tagging process may compare the users identified in the image, as well as the spatio-temporal data associated with such users (e.g., from check-in activity, events, calendars and the like) and identify whether the spatio temporal data of the users match the spatio-temporal data associated with the image. In particular embodiments, if the auto-tagging process finds a matching event to the image file, then the auto-tagging process may tag the image file with the matching event (Step 303 and 304). For example, if a photo has a location tag "Golden Gate Bridge" and a time stamp "Oct. 8, 2009", and a user tagged to the photo has an event "Fleet Week 2009, Golden Gate Bridge, Oct. 8, 2009" on his calendar in the social networking system, then the auto-tagging process can tag the event "Fleet Week 2009, Golden Gate Bridge, Oct. 8, 2009" to the photo since the event matched the location tag and the time stamp of the photo.

Figure 5:
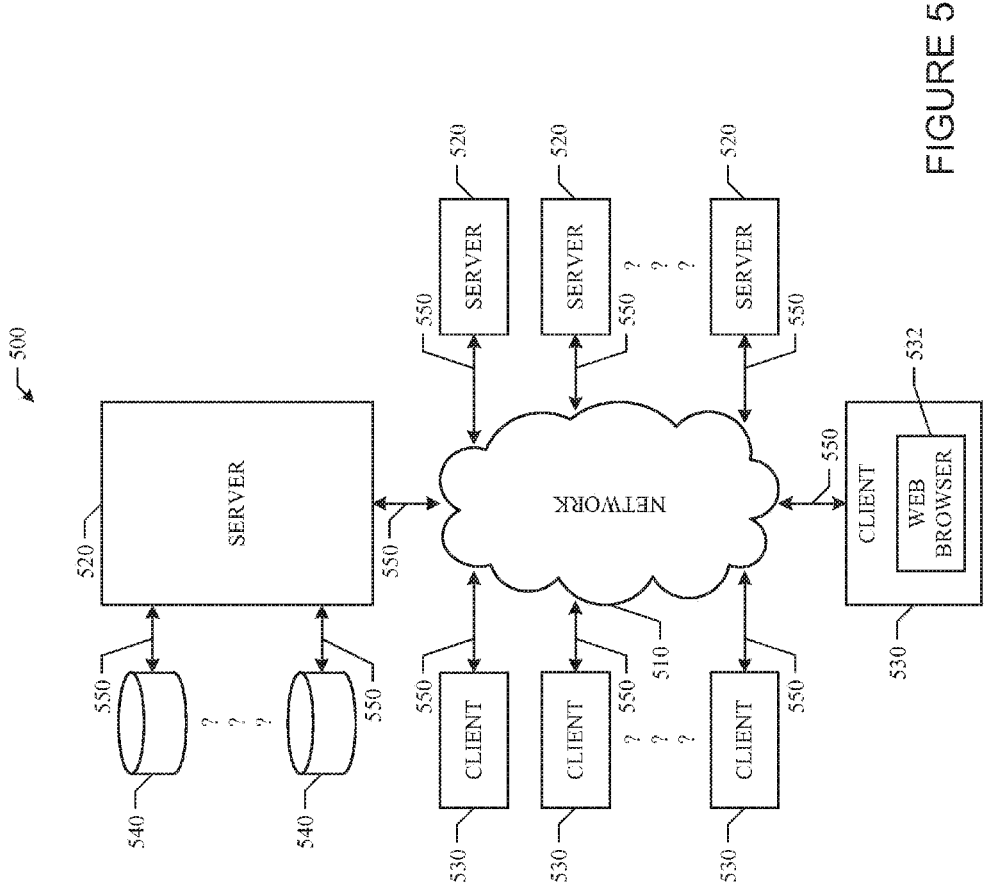
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
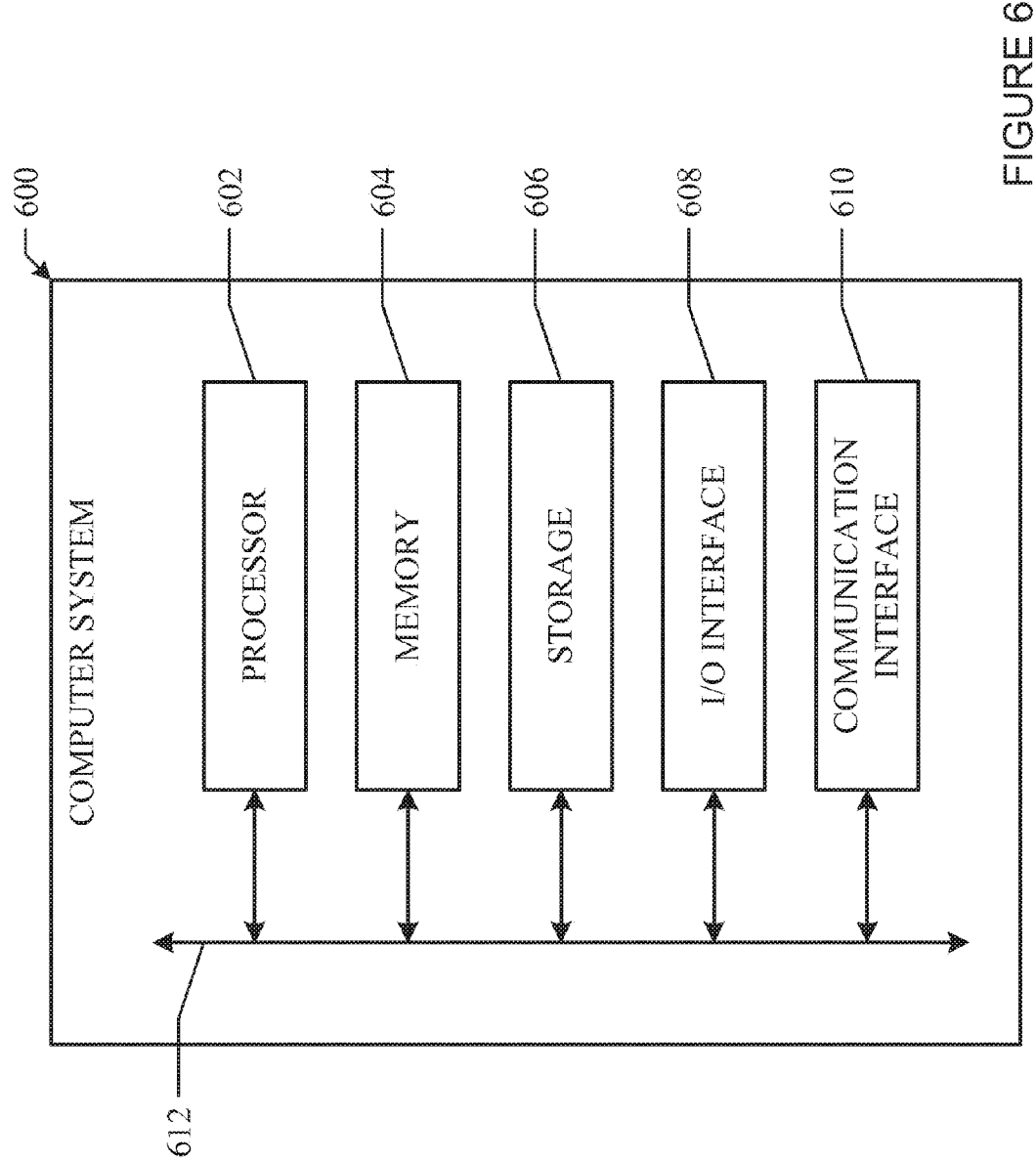
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 602, or storage 606; decode and execute them; and then write one or more results to an internal register, an internal cache, memory 602, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 602 or storage 606, and the instruction caches may speed up retrieval of those instructions by processor 602. Data in the data caches may be copies of data in memory 602 or storage 606 for instructions executing at processor 602 to operate on; the results of previous instructions executed at processor 602 for access by subsequent instructions executing at processor 602 or for writing to memory 602 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. As an example and not by way of limitation, computer system 600 may load instructions from storage 606 or another source (such as, for example, another computer system 600) to memory 602. Processor 602 may then load the instructions from memory 602 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 602. In particular embodiments, processor 602 executes only instructions in one or more internal registers or internal caches or in memory 602 (as opposed to storage 606 or elsewhere) and operates only on data in one or more internal registers or internal caches or in memory 602 (as opposed to storage 606 or elsewhere). One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 602, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by a computing device associated with a social-networking system, accessing a social-networking information item and a media file associated with a first user, wherein attributes of the social-networking information item comprise a list identifying one or more second users associated with the social-networking information item and a relationship between each of the one or more second users and the first user;
   by the computing device, determining based on a facial-recognition algorithm a matching score of each of one or more of the second users to each of one or more faces in the media file;

by the computing device, for each of the second users with a matching score above a threshold value to a face in the media file:
  comparing first spatio-temporal information of the media file with second spatio-temporal information of the second user, the second spatio-temporal information being determined based at least in part on one or more attributes of an event that the second user is registered as attending, wherein:
    the event is created and configured by a user using an application supported by the social-networking system;
    the event is stored in an event database associated with the social-networking system; and
    the attributes of the event comprise a time and date of the event and a location of the event specified by the user; and
  adjusting the matching score of the second user to the face based on the comparison and the relationship between the second user and the first user;
by the computing device, determining one or more potential matches between the second users and the faces in the media file based on the adjusted matching scores; and
by the computing device, tagging the media file with information identifying the social-networking information item based on one or more of the potential matches between the second users and the faces in the media file.

2. The method of claim 1 wherein the media file is a photograph with associated metadata in digital form or a video with associated metadata in digital form.

3. The method of claim 1 wherein the second spatio-temporal information of the second user comprises:
  one or more location data with time stamps as provided by a client computing device of the second user;
  one or more calendar entries of the second user; or
  one or more geo-social networking data of the second user.

4. The method of claim 1 wherein the first spatio-temporal information of the media file comprises:
  metadata associated with the media file comprising location data with a time stamp; or
  geo-social networking data of the first user associated with the media file.

5. The method of claim 1 further comprising:
  presenting one or more of the potential matches to the first user for confirmation.

6. The method of claim 1 wherein the social-networking information item comprises:
  a calendar entry, wherein the calendar entry was sent to the second users; or
  a check-in, wherein the second users are associated with the check-in.

7. The method of claim 1 further comprising, by the computing device, tagging the media file with spatio-temporal information of the social-networking information item.

8. A system comprising:
  one or more processors associated with a social-networking system; and
  a memory coupled to the processors comprising instructions executable by the processors, the processors being operable when executing the instructions to:
    access a social-networking information item and a media file associated with a first user, wherein attributes of the social-networking information item comprise a list identifying one or more second users associated with the social-networking information item and a relationship between each of the one or more second users and the first user;
    determine based on a facial-recognition algorithm a matching score of each of one or more of the second users to each of one or more faces in the media file;
    for each of the second users with a matching score above a threshold value to a face in the media file:
      compare first spatio-temporal information of the media file with second spatio-temporal information of the second user, the second spatio-temporal information being determined based at least in part on one or more attributes of an event that the second user is registered as attending, wherein
        the event is created and configured by a user using an application supported by the social-networking system;
        the event is stored in an event database associated with the social-networking system; and
        the attributes of the event comprise a time and date of the event and a location of the event specified by the user; and
      adjust the matching score of the second user to the face based on the comparison and the relationship between the second user and the first user;
    determine one or more potential matches between the second users and the faces in the media file based on the adjusted matching; and
    tag the media file with information identifying the social-networking information item based on one or more of the potential matches between the second users and the faces in the media file.

9. The system of claim 8 wherein the media file is a photograph with associated metadata in digital form or a video with associated metadata in digital form.

10. The system of claim 8 wherein the second spatio-temporal information of the second user comprises:
  one or more location data with time stamps as provided by a client computing device of the second user;
  one or more calendar entries of the second user; or
  one or more geo-social networking data of the second user.

11. The system of claim 8 wherein the first spatio-temporal information of the media file comprises:
  metadata associated with the media file comprising location data with a time stamp; or
  geo-social networking data of the first user associated with the media file.

12. The system of claim 8 wherein the processors are further operable when executing the instructions to:
  present one or more of the potential matches to the first user for confirmation.

13. The system of claim 8 wherein the social-networking information item comprises:
  a calendar entry, wherein the calendar entry was sent to the second users; or
  a check-in, wherein the second users are associated with the check-in.

14. The system of claim 8 wherein the processors are further operable when executing the instructions to tag the media file with spatio-temporal information of the social-networking information item.

15. One or more computer-readable non-transitory storage media associated with a social-networking system embodying software that is operable when executed by one or more computing devices to:

access a social-networking information item and a media file associated with a first user, wherein attributes of the social-networking information item comprise a list identifying one or more second users associated with the social-networking information item and a relationship between each of the one or more second users and the first user;

determine based on a facial-recognition algorithm a matching score of each of one or more of the second users to each of one or more faces in the media file;

for each of the second users with a matching score above a threshold value to a face in the media file:
  compare first spatio-temporal information of the media file with second spatio-temporal information of the second user, the second spatio-temporal information being determined based at least in part on one or more attributes of an event that the second user is registered as attending, wherein
    the event is created and configured by a user using an application supported by the social-networking system;
    the event is stored in an event database associated with the social-networking system; and
    the attributes of the event comprise a time and date of the event and a location of the event specified by the user; and
  adjust the matching score of the second user to the face based on the comparison and the relationship between the second user and the first user;

determine one or more potential matches between the second users and the faces in the media file based on the adjusted matching scores; and tag the media file with information identifying the social-networking information item based on one or more of the potential matches between the second users and the faces in the media file.

16. The media of claim 15 wherein the media file is a photograph with associated metadata in digital form or a video with associated metadata in digital form.

17. The media of claim 15 wherein the second spatio-temporal information of the second user comprises:
  one or more location data with time stamps as provided by a client computing device of the second user;
  one or more calendar entries of the second user; or
  one or more geo-social networking data of the second user.

18. The media of claim 15 wherein the first spatio-temporal information of the media file comprises:
  metadata associated with the media file comprising location data with a time stamp; or
  geo-social networking data of the first user associated with the media file.

19. The media of claim 15 wherein the software is further operable when executed by the computing devices to:
  present one or more of the potential matches to the first user for confirmation.

20. The media of claim 15 wherein the social-networking information item comprises:
  a calendar entry, wherein the calendar entry was sent to the second users; or
  a check-in, wherein the second users are associated with the check-in.

* * * * *